United States Patent [19]
Tokunaga et al.

[11] Patent Number: 5,380,384
[45] Date of Patent: Jan. 10, 1995

[54] METHOD OF FORMING GREEN TIRE

[75] Inventors: Toshio Tokunaga, Fuchu; Naomichi Soga, Kokubunji; Haruo Kawashima, Kodaira, all of Japan

[73] Assignee: Bridgestone Corporation, Tokyo, Japan

[21] Appl. No.: 205,730

[22] Filed: Mar. 4, 1994

[30] Foreign Application Priority Data

Mar. 4, 1993 [JP] Japan .................. 5-067327
Mar. 19, 1993 [JP] Japan .................. 5-083883

[51] Int. Cl.$^6$ ............................ B29D 30/20
[52] U.S. Cl. ...................... 156/111; 156/126; 156/130.7; 156/133; 156/396; 156/406.2
[58] Field of Search .............. 156/111, 126, 128.1, 156/130.7, 396, 406.2

[56] References Cited

U.S. PATENT DOCUMENTS

| | | | |
|---|---|---|---|
| 3,833,445 | 9/1974 | Mallory et al. | 156/401 |
| 4,007,069 | 2/1977 | Takayanagi et al. | 156/123 |
| 4,634,489 | 1/1987 | Dupommier | 156/406.2 |
| 4,685,992 | 8/1987 | Irie | 156/396 |
| 5,051,149 | 9/1991 | Ishii | 156/406.2 |

Primary Examiner—Geoffrey L. Knable
Attorney, Agent, or Firm—Sughrue, Mion, Zinn, Macpeak & Seas

[57] ABSTRACT

Bead wires 4 are set at both ends of a carcass ply 2, to form bead portions 5 and 5. Then, a carcass body 6a incorporated with a toroidal BT band 9 around the outer periphery portion is mounted on a forming drum 13 around which side rubbers 20 are mounted through bladders 16 and 17 at the positions corresponding to the bead portions 5 and 5. Thus, by expansion of the bladders 16 and 17, the side rubbers 20 are press-contacted with both the sides of the carcass body 6a.

3 Claims, 12 Drawing Sheets

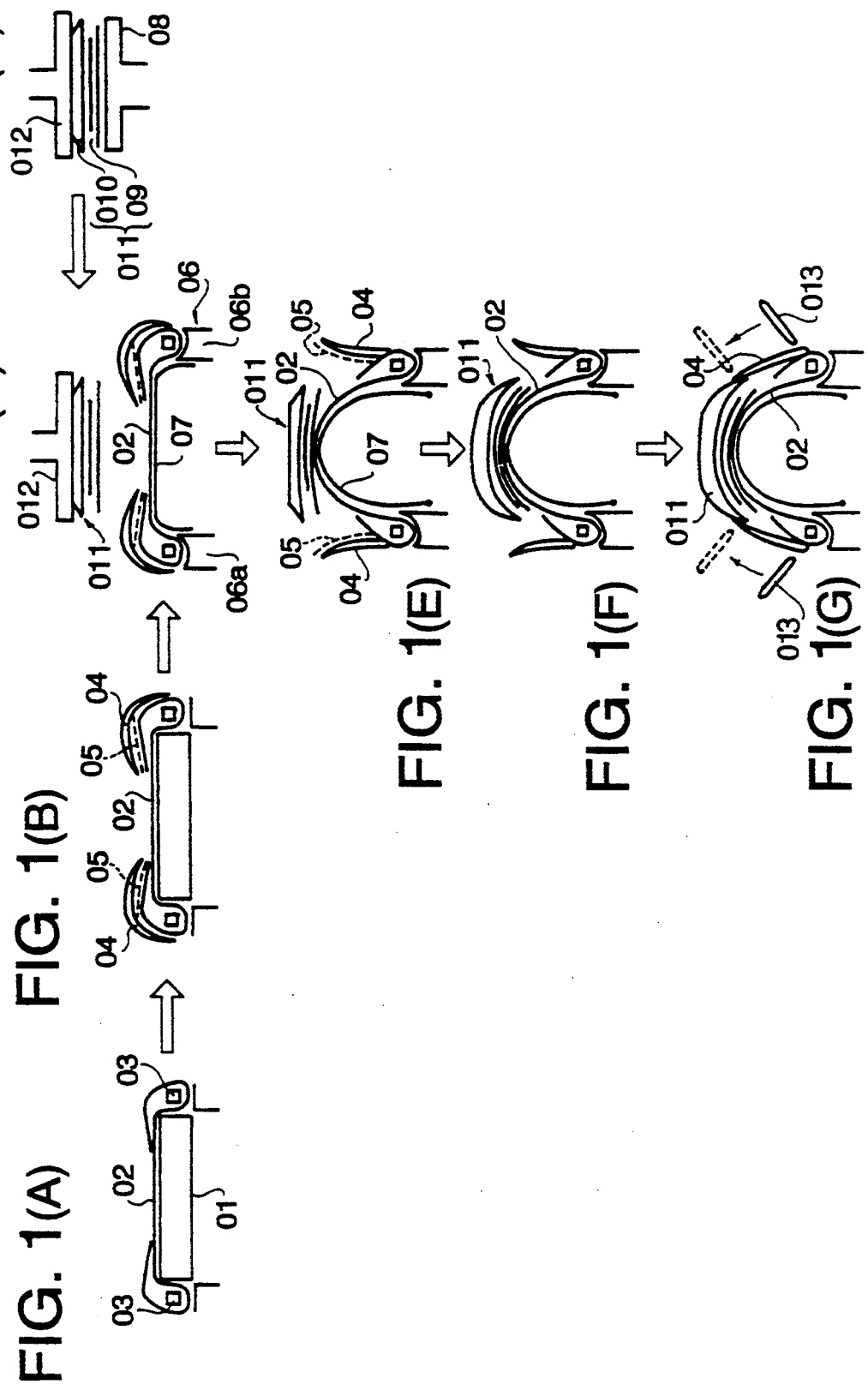

METHOD OF FORMING GREEN TIRE

BACKGROUND OF THE INVENTION

The present invention relates to a method of forming a pneumatic tire for an automobile.

In general, pneumatic tires for automobiles are manufactured as follows: Namely, the inner surface of a tire is formed of a toroidal carcass ply on which an inner liner is lined. The crown portion of the carcass ply is covered with a BT band composed of a belt and a tread rubber, whereas portions extending from the side surfaces of the carcass ply to the outer peripheral BT band are covered with side rubbers. The green tire with such a construction is first formed of a green rubber, and is then vulcanized.

Conventionally, the formation of the green tire described above has been carried out, for example, in such a procedure as shown in FIG. 1. First, as shown in (A) of this figure, a carcass ply 02 is wound around a first forming drum 01 in a cylindrical shape, and bead wires 03 are mounted at both the end portions of the carcass ply 02, and subsequetntly, the carcass ply 02 is folded in such a manner as to wrap these bead wires 03. Next, as shown in (B), side rubbers 04 are wound and stuck around both the folded ends. In this case, a sheet 05 made from polyethylene or the like (hereinafter, referred to as "polysheet") is interposed between each of the side rubbers 04 and the carcass ply 02 such that the inner peripheral surface portion of the side rubber 04 is not adhesively bonded on the carcass ply 02.

The carcass body thus formed is removed from the first forming drum 01, and is transferred onto a second forming drum 06 (see (D)). The second forming drum 06 is so constructed that a pair of drum bodies 06a and 06b with the end surfaces being opposed to each other are connected to each other by means of a bladder 07. A pressurized fluid is supplied within the bladder 07 and both the drum bodies 06a and 06b are moved so as to be close to each other, so that the bladder 07 is expanded/deformed in a toroidal shape as shown in (E).

As shown in (C), a BT band 011 composed of a belt 09 and a tread 010 is separately formed on a BT drum 08. The BT band 011 is transferred by use of a transfer ring 012, and is positioned over the outer peripheral portion of the second forming drum 06 on which the above carcass body is mounted (see (D)).

As shown in (E), the above side rubbers 04 are raised outward to remove the polysheets 05, and in such a state the bladder 07 is expanded as described above. Accompanied with the expansion of the bladder 07, the carcass ply 02 is deformed in a toroidal shape, and is press-contacted with the BT band 011 positioned on the outer peripheral portion side of the carcass ply 02.

As shown in (F), the BT band 011 is bent along the carcass ply 02 by a stitcher (not shown), and is adhesively bonded therewith. Subsequently, as shown in (G), folding stitchers 013 are moved in the directions shown by the arrows, so that the side rubbers 04 are press-bonded on the side surfaces of the carcass ply 02 and the side edge portions of the BT band 011.

In the conventional method of forming a green tire described above, when the side rubbers 04 are wound around the first forming drum 01, the polysheets 05 must be wound together with the side rubbers 04, and further, the polysheets 05 must be removed prior to the process of expanding/deforming the carcass ply 02. This needs the excessive process and lengthens the time required for the forming work.

Moreover, since the polysheet 05 is reused, the recover of the polysheet takes a lot of labor, and a reproducing apparatus must be installed.

Additionally, when the polysheet 05 is removed, the side rubber 04 is raised, as a result of which the side rubber 04 is deformed. This often causes the failure in the shape of the side rubber after being press-bonded on the side surface of the tire.

SUMMARY OF THE INVENTION

Taking the above circumstances into consideration, the present invention has been made. A method of forming a green tire according to the present invention includes a process of setting bead wires at both ends of a cylindrical carcass ply on a first forming drum for forming a carcass body having bead portions: a process of positioning a BT band formed in a separate process over an outer peripheral portion of the carcass body, on the first forming drum and deforming the carcass body into a toroidal shape for incorporating the carcass body with the BT band; a process of mounting the carcass body incorporated with the BT band onto a second forming drum around which side rubbers are wound through bladders at positions corresponding to the bead portions at both the ends of the carcass ply while keeping the shape of the carcass body; and a process of expanding the bladders for pressbonding the side rubbers on both the ends of the carcass body.

According to the method of the present invention, when a carcass body is firstly formed, side rubbers are not stuck on the carcass body. The side rubbers are wound around a second forming drum for mounting the carcass body incorporated with a BT band, and are finally press-bonded on both the ends of the carcass body by use of bladders.

Accordingly, the present invention eliminates the processes of interposing a polysheet between the carcass body and each side rubber and removing the side rubber again in the later process. Further, works for recovering and reusing the polysheet are eliminated. This makes it possible to simplify the forming work and to shorten the time required for the forming work. Additionally, the forming work is easily automated and the quality of a tire is improved.

According to another feature of the present invention, the above carcass body with the BT band is carried to the above second forming drum by a holding/carrying apparatus. This holding/carrying apparatus is composed of an outer periphery holding body for holding the outer peripheral surface of the carcass body with the BT band, and a pair of bead portion holding bodies positioned on both the sides of the outer periphery holding body for holding the bead portions of the carcass body with the BT band.

Conventionally, in carrying a green tire semi-product formed in a toroidal shape, there has been generally used a holding/carrying apparatus for holding only the outer peripheral surface of the semi-product.

However, in the carcass body with the BT band used in the present invention, the belt and tread are only stuck on the outer peripheral surface portion of the carcass body and the side rubbers are not stuck on both the sides yet, and accordingly, when such a carcass body with the BT band is carried to the second forming drum by the above-described conventional holding/carrying apparatus for holding only the outer peripheral surface, the carcass body is difficult to be exactly mounted on the second forming drum because the bead portions of the carcass body are weak in rigidity, which often causes the fault in the positioning operation, thus deteriorating the tire quality.

According to the present invention, the carcass body with the BT band is carried in the condition that not only the outer peripheral surface but also the bead portions on both the sides are held, and thereby it can be carried to and mounted on the second forming drum without any deformation of the bead portions, that is, it can be exactly positioned and mounted on the second forming drum.

BRIEF DESCRIPTION OF THE DRAWINGS

FIG. 1 is a view showing processes of a conventional green tire forming method;

DETAILED DESCRIPTION OF THE EMBODIMENT

FIGS. 2 to 6 show one embodiment of a method of forming a green tire according to the present invention. Hereinafter, the present invention will be described with reference to these figures.

FIGS. 2a to 2h show the processes of the method of the present invention in sequence. According to the present invention, first, a carcass ply 2 is wound around a first forming drum 1 in a cylindrical shape. As shown in FIG. 3, the first forming drum 1 is so constructed that drum bodies 1a and 1b, which are spaced in the right and left while the end surfaces are opposed to each other, are connected to each other by a cylindrical bladder 3. A pressurized fluid is introduced within the bladder 3 to expand the bladder 3, and the right and left drum bodies 1a and 1b are moved to be close to each other, so that the bladder 3 is deformed in such a toroidal shape as shown in the chain line.

Figure 2A:
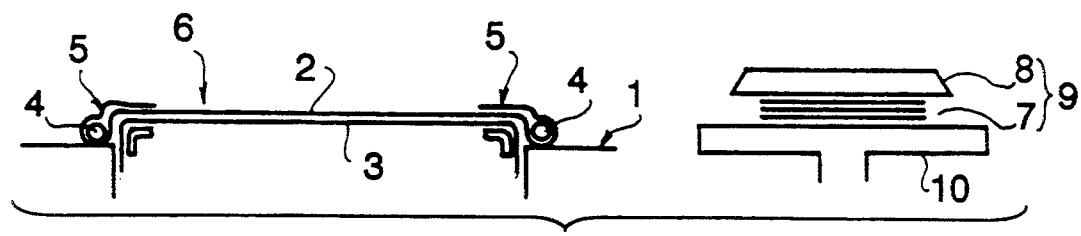
FIGS. 2a to 2h are schematic views showing processes of the present invention in sequence.
Figure 3:
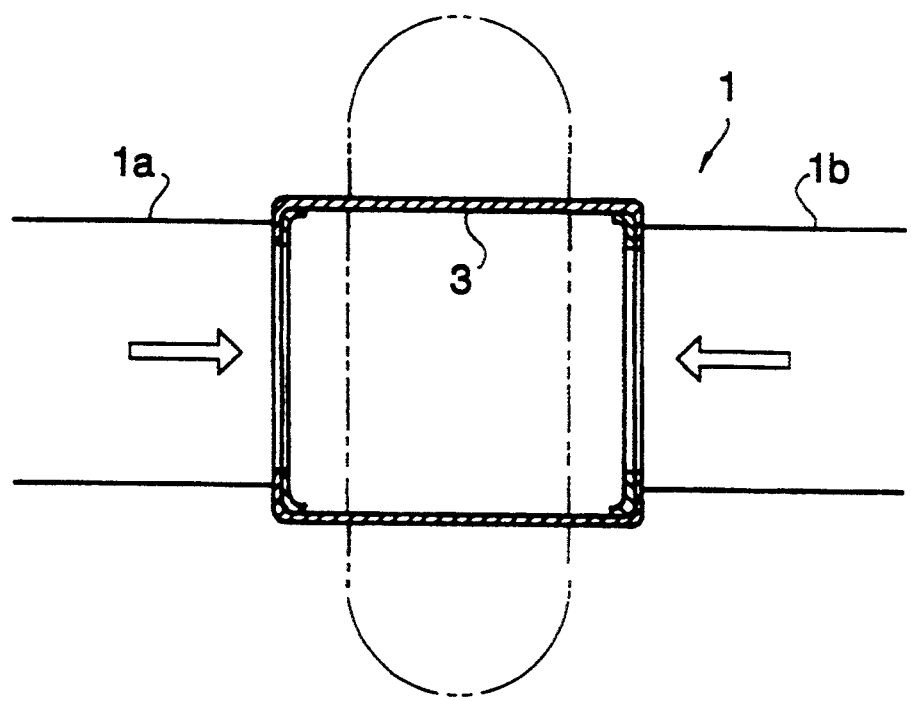
FIG. 3 is a vertical schematic view showing essential parts of a first forming drum.

As shown on the left side of FIG. 2a, the carcass ply 2 is wound around the first forming drum 1, and bead wires 4 are further set around both the end portions of the carcass ply 2. Both the outer edges of the carcass ply 2 are each folded on the bead wires 4, to thereby form a carcass body 6 having bead portions 5 at both the sides.

Separately from this process, as shown on the right side of the figure, a BT band 9 composed of a belt 7 and a tread 8 is formed on a BT drum 10.

Figure 2B:
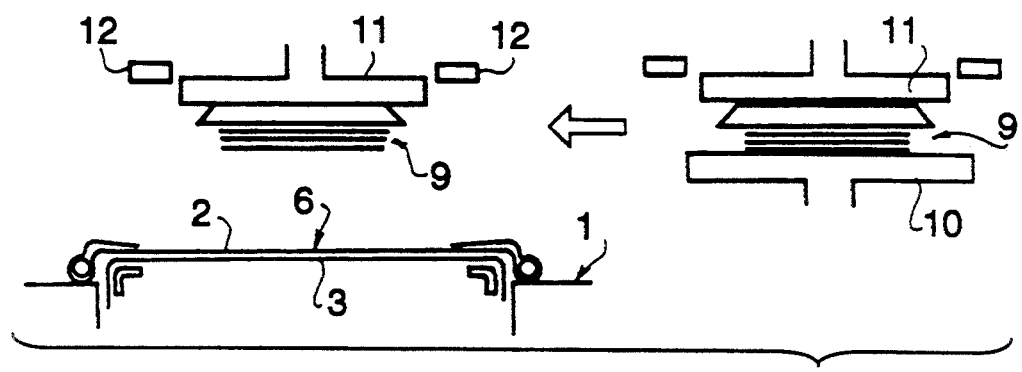
Figure 2C:
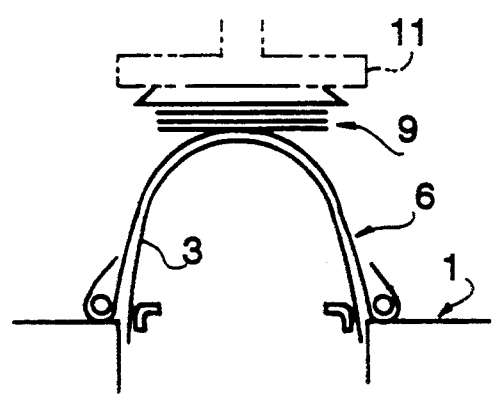

After the carcass body 6 is formed on the first forming drum 1 as described above, the BT band 9 on the BT drum 10 is carried by a transfer ring 11, and is positioned over the outer peripheral portion of the first forming drum 1, that is, at the position where the BT band 9 coaxially surrounds the first forming drum 1 (see FIG. 2b). In such a state, as described above, the bladder 3 is expanded/deformed in a toroidal shape. Accompanied by the expansion of the bladder 3, the carcass ply 2 is also expanded/deformed in a toroidal shape, and is contacted with the inner surface of the BT band 9 positioned on the outer peripheral portion side of the carcass ply 2, to thereby support the BT band 9. In this step, the transfer ring 11 is removed (see FIG. 2c).

Figure 2D:
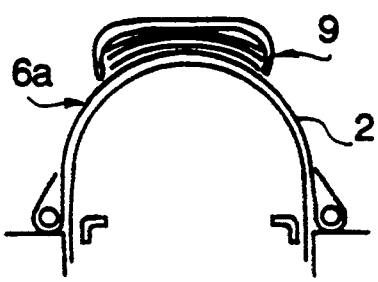
Figure 2E:
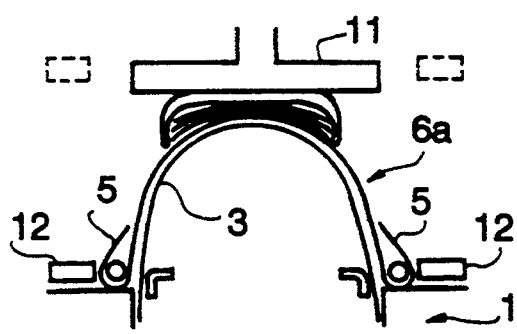

The BT band 9 is pressed on the peripheral surface of the carcass ply 2 by a stitcher (not shown), to adhesively bond both the BT band 9 and the carcass ply 2 with each other, thereby forming a carcass body with a BT band (hereinafter, referred to as "carcass body 6a") (see FIG. 2d). The transfer ring 11 is then mounted on the outer periphery of the carcass body 6a again (see FIG. 2e). Beadring portion holding rings 12 capable of being freely reduced in diameter are provided on both the sides of the transfer ring 11. The bead portion holding rings 12 are then reduced in diameter and are moved to be along the outer sides of the bead portions 5 of the carcass body 6a. Thus, the carcass body 6a is in the state that the whole periphery of the carcass body 6a is fixed by the transfer ring 11 and the bead portions 5 are fixed from both the sides by means of the bead portion holding rings 12. In such a state, the bladder 3 is contracted, and the carcass body 6a is removed from the first forming drum 1.

Figure 2F:
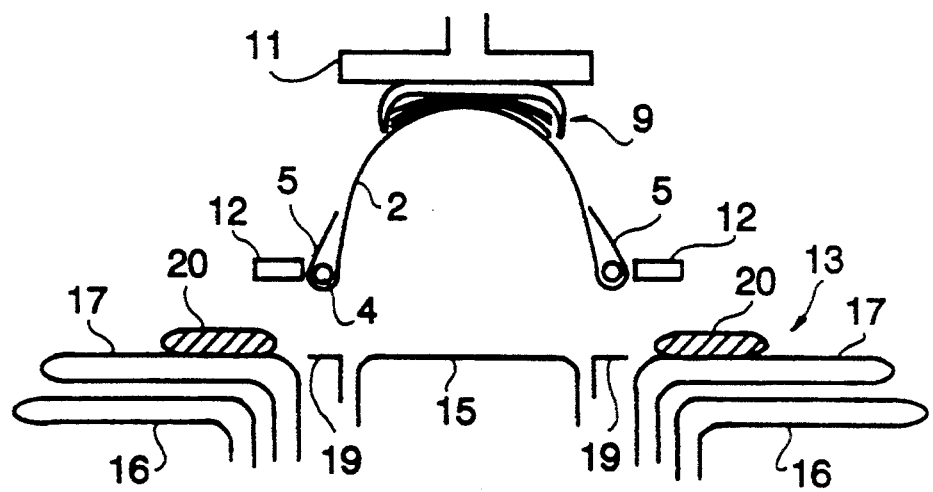
Figure 4:
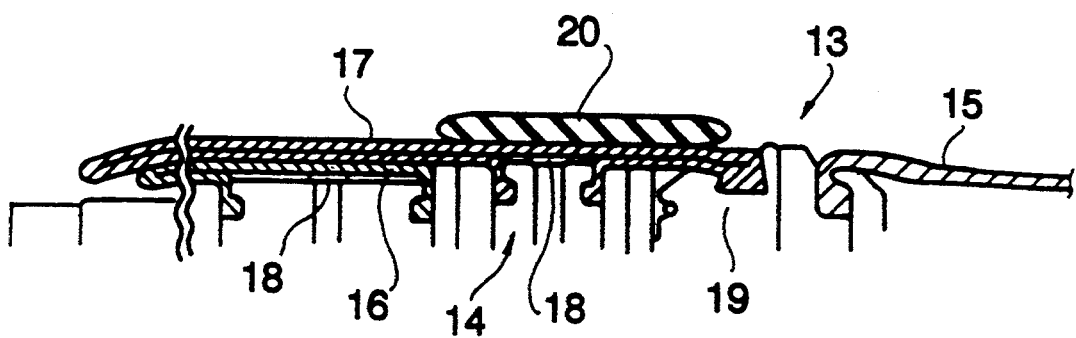
FIG. 4 is a partial vertical sectional view of a second forming drum before a carcass body is mounted thereon.

The carcass body 6a thus removed is carried by the transfer ring 11, and is mounted on a second forming drum 13 as shown in FIG. 2f. Just as the first forming drum 1, the second forming drum 13 is so constructed that the right and left drum bodies are connected to each other by means of a cylindrical bladder. FIG. 4 is a vertical sectional view showing a radially outward portion of the left half portion of the second forming drum 13, wherein numeral 14 indicates a drum body and numeral 15 indicates the bladder for connecting both the right and left drum bodies. Two of inner and outer side bladders 16 and 17 are mounted on the outer peripheral surface of each drum body 14 such that the mounting positions are shifted from each other in the right and left. Pressurized fluids can be respectively supplied to the side bladders 16 and 17 through inlets 18. The side bladders 16 and 17 are usually formed in flat shapes as shown in the figure, and the side bladder 17 forms the outer peripheral surface of the drum.

The edge of the bladder 15 is locked to the inner peripheral edge of the drum body 14, and a bead look ring 19 is provided so as to be adjacent to the edge of the bladder 15. The bead lock ring 19 is composed of a plurality of pieces divided in the peripheral direction, and which is extended in diameter as a whole by projecting of the pieces outward in the radial direction. The inner edge of the side bladder 17 is locked to the bead lock ring 19. FIG. 2f is a schematic view of main parts of the second forming drum 13, wherein corresponding parts are indicated at the same reference numerals.

In addition, prior to transfer of the carcass body 6a formed on the first forming drum 1 onto the second forming drum 13, side rubbers 20 are windingly mounted on the right and left side bladders 17 of the second forming drum 13 at the specified positions (see FIG. 2f, FIG. 4).

Figure 2G:
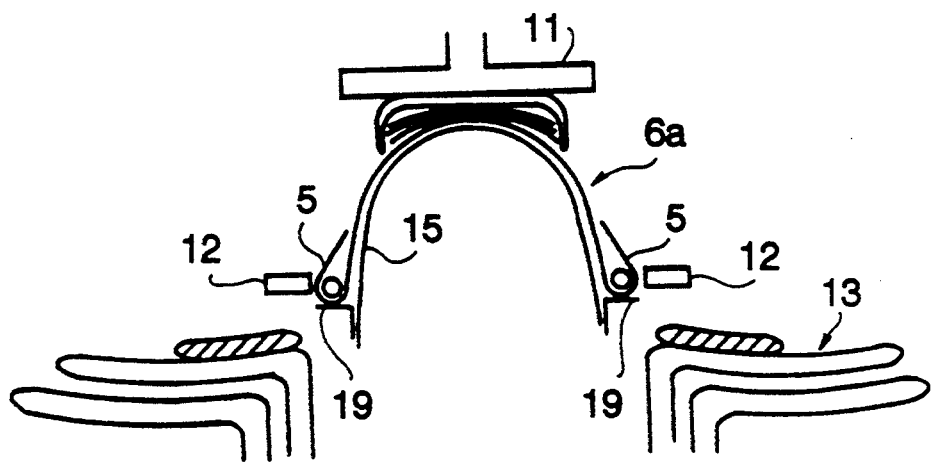
Figure 5:
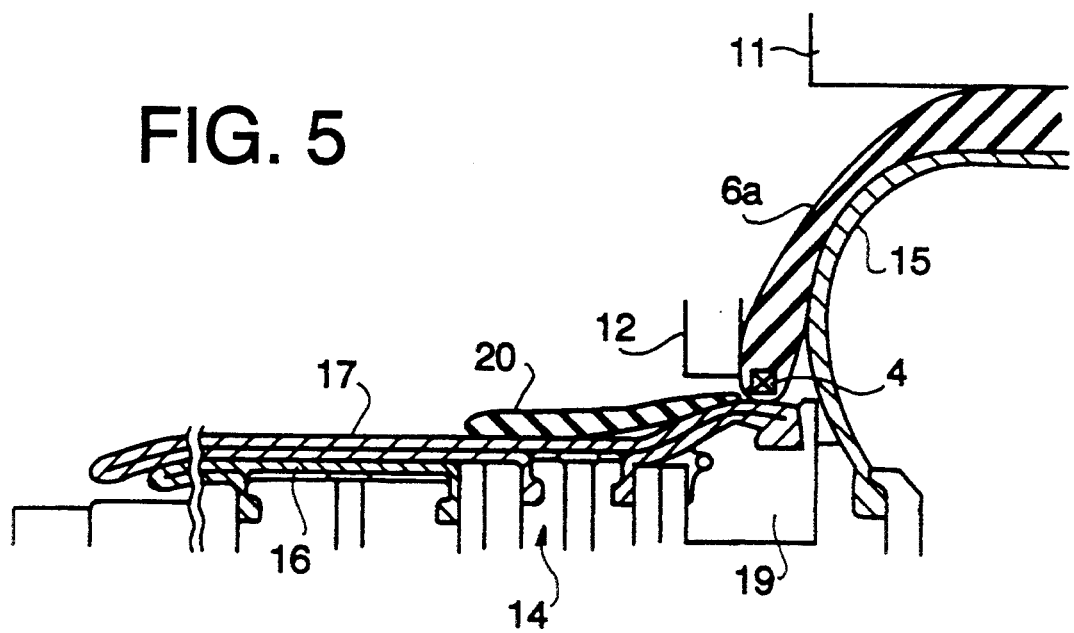
FIG. 5 is a partial vertical sectional view of the second forming body after the carcass body is mounted thereon.

After the carcass body 6a is positioned at the outer periphery of the second forming drum 13, the bladder 15 is expanded to support the carcass body 6a from the inner side by means of the bladder 15, while the bead look rings 19 are extended in diameter to support the bead portions 5 from the inner side in the radial direction by means of the bead lock rings 19 (see FIG. 2g, FIG. 5). Thereafter, the transfer ring 11 and the bead portion holding rings 12 are removed from the carcass body 6a.

Figure 2H:
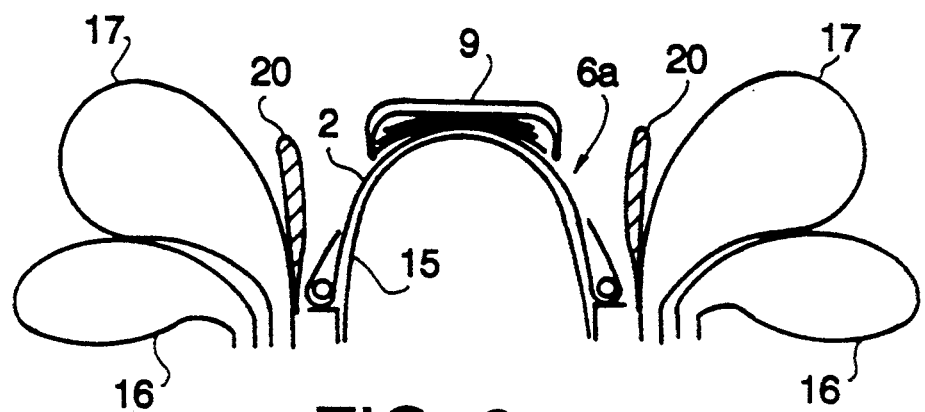
Figure 6:
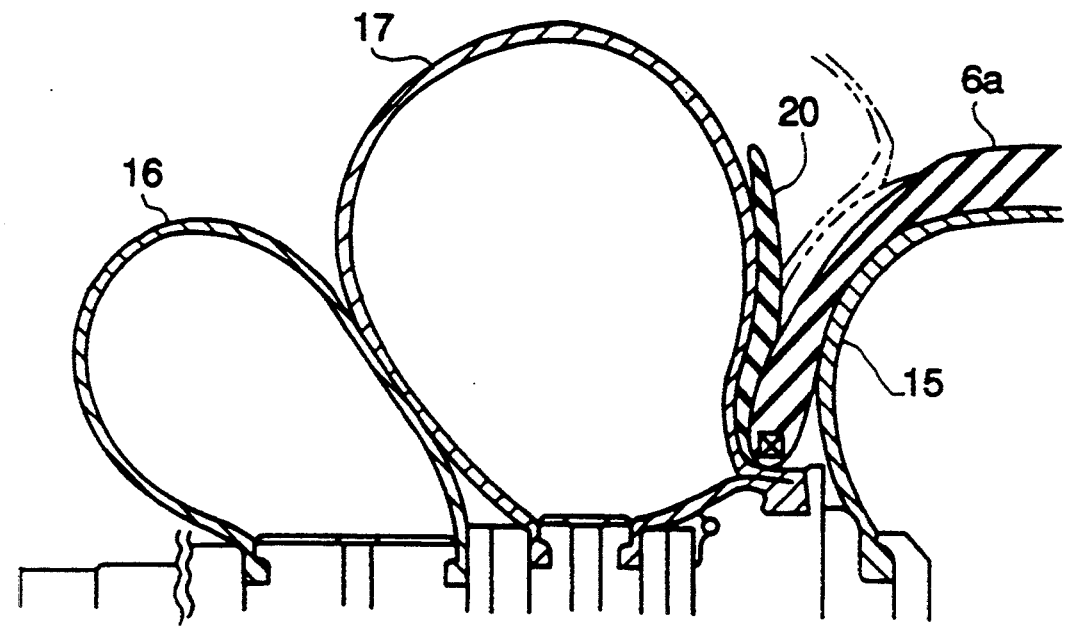
FIG. 6 is a partial vertical sectional view showing the second forming body when side bladders are expanded.

Subsequently, as shown in FIG. 2h and FIG. 6, pressurized fluids are introduced within the side bladders 16 and 17, to expand these side bladders 16 and 17. Each side rubber 20 is pushed out by the expanded side bladder 17, and is raised outward; however, since the side bladder 17 is pushed by the expanded side bladder 16 and is expanded so as to cover the side surface of the carcass body 6a, the side rubber 20 is folded on the side surface of the carcass body 6a as shown in the chain line of FIG. 6. The side rubber 20 is thus press-contacted with the side surface of the carcass body 6a and is adhesively bonded therewith, to thereby form a green tire having the carcass ply 2, the BT band 9 and the side rubbers 20.

In this forming method, the side rubbers 20 are not formed on the carcass body 6a before the carcass body 6a is formed in the toroidal shape, that is, the side rubbers 20 are wound around the second forming drum 13 and are press-bonded on the carcass body 6a after being formed. This eliminates the necessity of providing the polysheet for preventing the adhesive bonding between the side rubbers and the carcass ply in the early stage of the process just as in the conventional manner.

Accordingly, the insertion of the polysheet, the work for removing the polysheet, and the work of recovering the removed polysheet are not required, so that the forming work is simplified and the time required for the forming work is reduced. Moreover, since the manual work in association with the polysheet is eliminated, the forming work is easily automated, and the quality of the tire product is improved.

Next, there will be described a holding/carrying apparatus used for carrying the carcass body 6a from the first forming drum 1 to the second forming drum 13. The holding/carrying apparatus is composed of an outer periphery holding body for holding the outer peripheral surface of the carcass body 6a (equivalent to the above transfer ring 11); bead portion holding bodies each positioned on both the sides of the outer periphery holding body for holding the bead portions of the carcass body 6a (equivalent to the above bead portion holding rings 12); and a bead portion holding body drive mechanism for approaching/separating the bead portion holding bodies on both the sides to or from each other symmetrically with respect to the outer periphery holding body. Each of the above outer periphery holding body and the bead portion holding body is composed of a plurality of holding segments which are arranged substantially with equal intervals in the circumferential direction and are movable in the radial direction; and a holding segment extending/contracting mechanism for radially moving these holding segments and extending/contracting the diameters of them.

First, the function of the holding/carrying apparatus will be described with reference to FIGS. 7a to 7c. These figures are equivalent to the above-described figures, FIGS. 2d to 2e. Referring to these figures, a first forming drum 1 includes bead look rings 1a capable of extended/contracted. A carcass body 6a is integrally bonded with a tread 8 on the outer peripheral portion of a carcass ply 2 through a belt 7. Bead portions 5, in which bead wires 4 are each set, are formed on both the sides of the carcass ply 2. The carcass body 6a is formed such that it is extended in a toroidal shape by applying of a pressure p from the inside while the bead portions are supported by the bead look rings 1a extended in diameter.

Numeral 31 indicates a holding segment provided on the outer periphery holding body of the carrying apparatus, and 33, 33 are holding segments respectively provided on the bead portion holding bodies on both the sides.

Figure 7A:
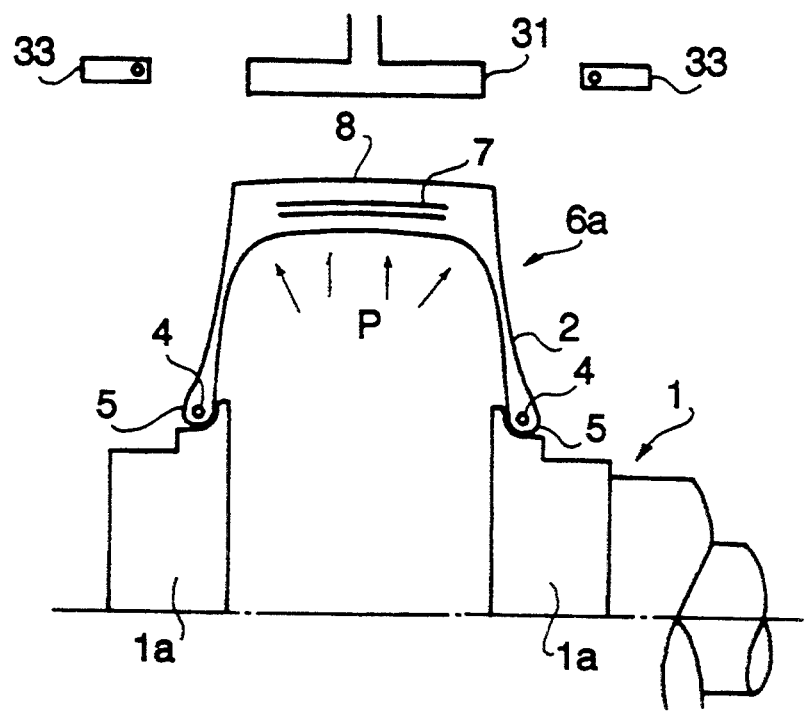
FIGS. 7a to 7c are schematic views for explaining the function of a holding/carrying apparatus.

When the carcass body 6a is removed from the first forming drum 1 and is carried to the second forming drum, the whole of the apparatus is first moved along the axial line of the forming drum 1 up to the position that the holding segments 31 and 33 surround the outer peripheral portion of the carcass body 6a, as shown in FIG. 7a.

Figure 7B:
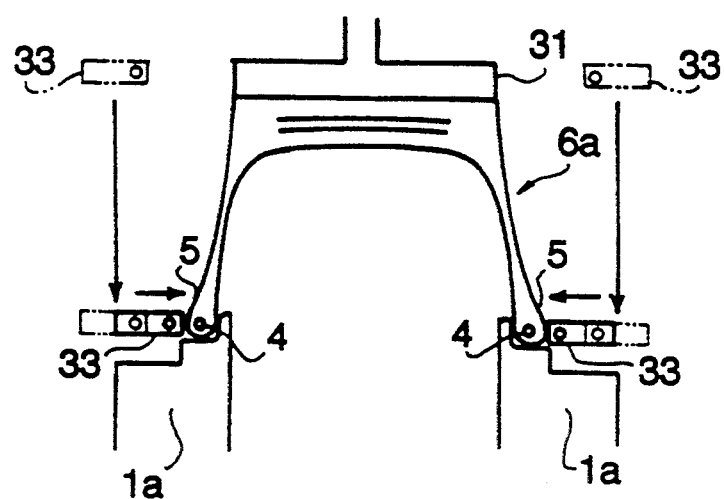
Figure 7C:
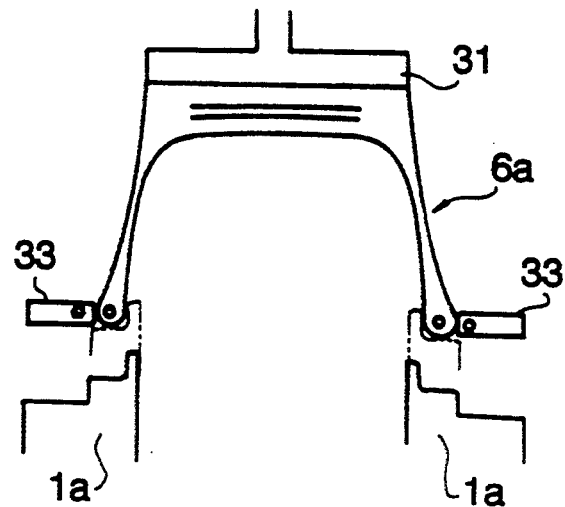

Subsequently, as shown in FIG. 7b, the holding segments 31 are contracted in diameter by the extending-/contracting mechanism to hold the outer peripheral surface of the carcass body 6a, and the holding segments 33, 33 are contracted in diameter up to the positions facing to the bead portions 5 by the extracting-/contracting mechanism. After that, the bead portion holding bodies on both the sides are moved to be close to each other by the bead portion holding body drive mechanism, so that the bead portions 5 are held from both the sides by the holding segments 33 and 33. Magnets for attracting the bead wires 4 are preferably arranged on the surfaces of the holding segments 33 and 33 abutted on the bead portions 5.

After the outer peripheral surface of the carcass body 6a is held by the holding segments 31 and the beads portions 5 on both the sides are respectively held by the holding segments 33 and 33, the bead lock rings 1a are contracted to separate the carcass body 6a from the forming drum 1 (see FIG. 7c), and subsequently, the whole of the holding/carrying apparatus is moved in the axial direction of the forming drum 1, to thus carry the carcass body 6a to the second forming drum.

Since the carcass body 6a is carried in the condition that not only the outer peripheral surface but also the bead portions on both the sides are held, it can be carried to and mounted on the subsequent forming drum without any deformation ortions, that is, it can be exactly positioned and mounted on the subsequent forming drum.

Figure 8:
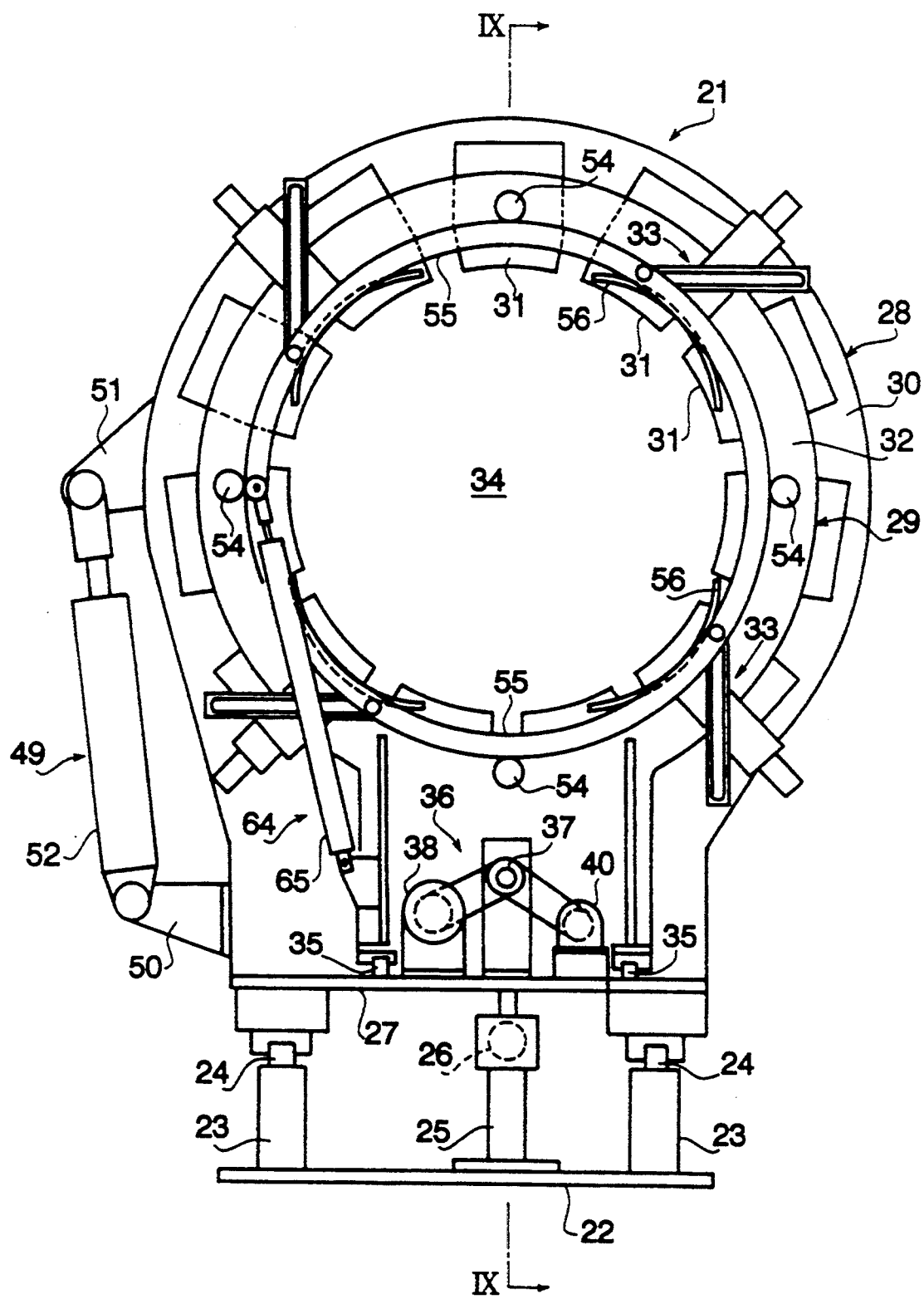
FIG. 8 is a front view showing the whole construction of the holding/carrying apparatus.
Figure 9:
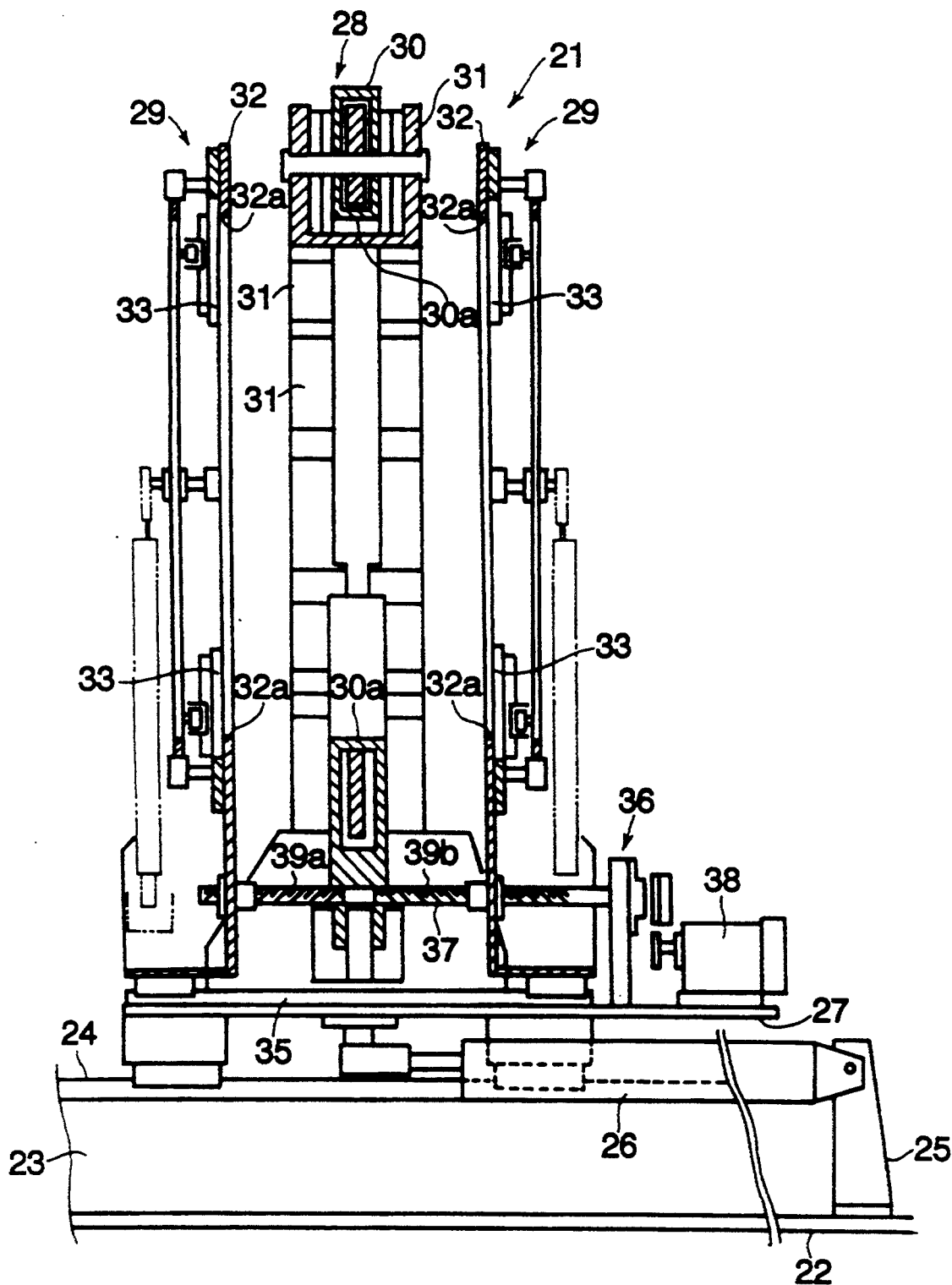
FIG. 9 is a sectional view taken along the line IX—IX of FIG. 8.

FIGS. 8 and 9 views showing the whole construction of a holding/carrying apparatus 21 of the present invention, wherein FIG. 8 is a front view and FIG. 9 is a vertical side view. The holding/carrying apparatus 21 is supported on beds 23 provided on a base plate 22 so as to be freely travelled in the lateral direction (of FIG. 9, the same shall apply hereafter) while being guided by rails 24 provided on the beds 23. The apparatus 21 is travelled by drive of a cylinder apparatus 26 disposed between a mounting member 25 erected on the base plate 22 and a bottom plate 27 of the apparatus 21.

As shown in FIG. 9, fin the holding/carrying apparatus 21, bead portion holding bodies 29 for holding the bead portions 5 of the carcass body 6a which are erected on the right and left sides of an outer periphery holding body 28 for holding the outer peripheral surface of the carcass body 6a.

The outer periphery holding body 28 is so constructed that the outer periphery holding segments 31 are mounted on an annular supporting frame 30 having a circular opening 30a. The outer periphery holding segments 31 are disposed by a plurality of number (11 pieces, in this embodiment) with equal intervals along the opening 30a. In each of the right and left bead portion holding bodies 29, the bead portion holding segments 33 are similarly mounted on an annular supporting frame 32 having a circular opening 32a. The bead portion holding segments 33 are disposed by a plurality of number (4 pieces, in this embodiment) with equal intervals along the opening 32a.

The above opening 30a and each of the openings 32a on both the sides are matched to each other in the lateral direction, and a cylindrical opening portion 34 passing through the holding/carrying apparatus 21 in the lateral direction is formed of these openings 30a and 32a. This opening portion 34 is positioned along the same axial line as that of the above forming drum 1. In holding/carrying the carcass body 6a on the drum 1, the whole of the holding/carrying apparatus 21 is travelled by the cylinder apparatus 26 up to the position of the forming drum 1 along the rails 24 in parallel to the axial line of the opening portion 34, to contain the carcass body 6a together with the forming drum 1 within the opening portion 34.

The supporting frame 30 of the outer periphery holding body 28 is fixed on the bottom plate 27, whereas the supporting frame 32 of each of bead portion holding bodies 29 is supported on rails 35 provided on the bottom plate 27 so as to be movable along the rails 35. The supporting frames 32 are driven by the bead portion holding body drive mechanism 36 to be moved along the rails 35 in such a manner as to be close to or apart from each other, and are thus usually positioned symmetrically with respect to the supporting frame 30 of the outer periphery holding body 28. The bead portion holding body drive mechanism 36 is composed of a screw shaft 37 which is screwed with the right and left supporting frames 32 and pass through them, and a motor 38 for turning the screw shaft 37. The screw shaft 37 has screws 39a and 39b respectively threaded in opposed pitches on the right and left sides (FIG. 9). The left supporting frame 32 is screwed with the left screw 39a, while the right supporting 32 is screwed with the right screw 39b. so that the right and left supporting frames 32 are moved by the rotation of the screw shaft 37 in the opposed directions by equal distances, that is, to be close to or apart from each other.

The rotation of the screw shaft 37 is transmitted to an encoder 40 (FIG. 8), and the motor 38 is controlled on the basis of a signal obtained by the encoder 40 according to the rotational angle of the screw shaft 37, that is, the moving distance of the supporting frame 32. Therefore, by control of the motor 38 on the basis of the signal, it is possible to exactly set the moving distance of the supporting frame 32, that is the width between the right and left frames 32.

Figure 10:
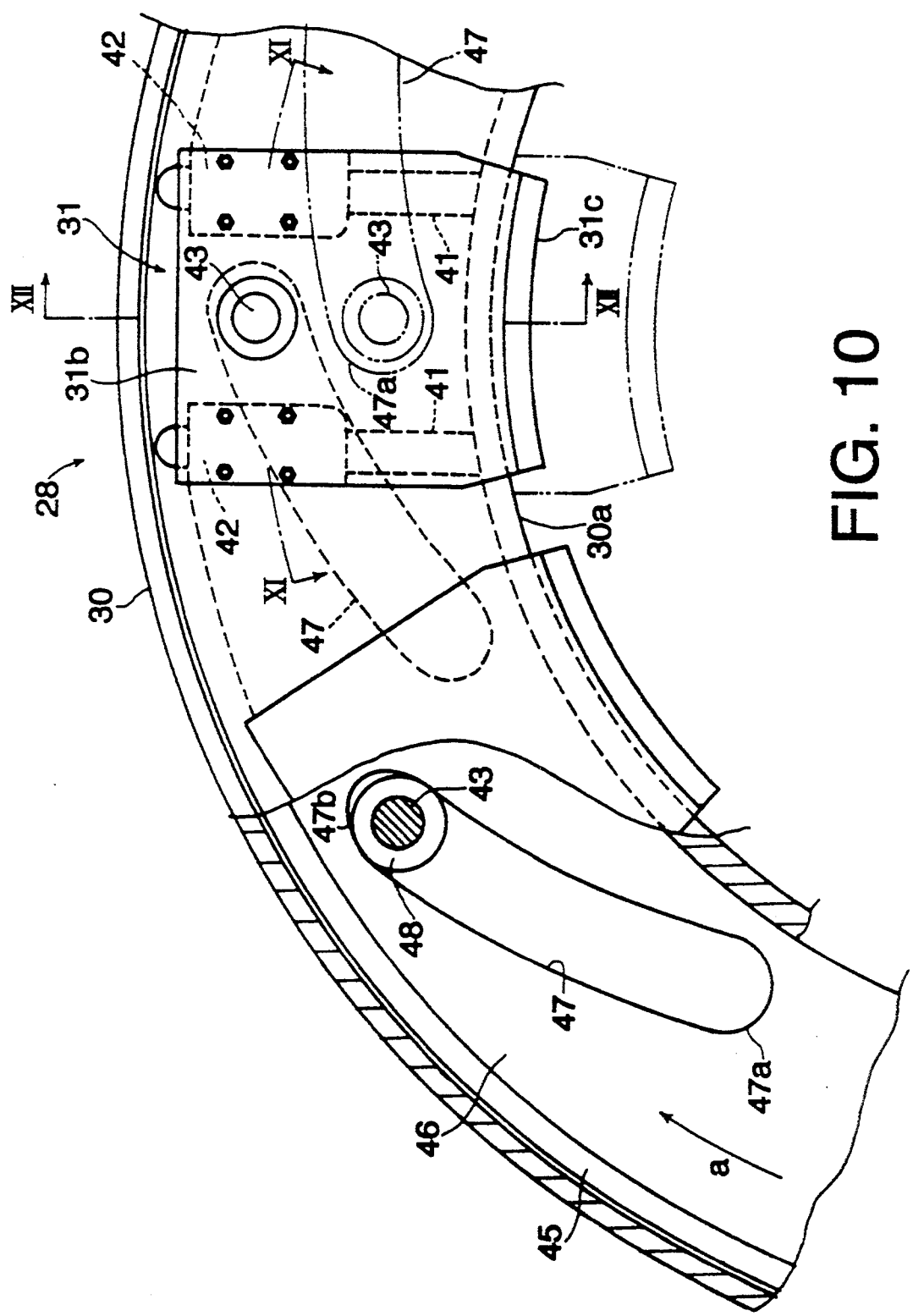
FIG. 10 is a partial front view of an outer periphery holding body.
Figure 11:
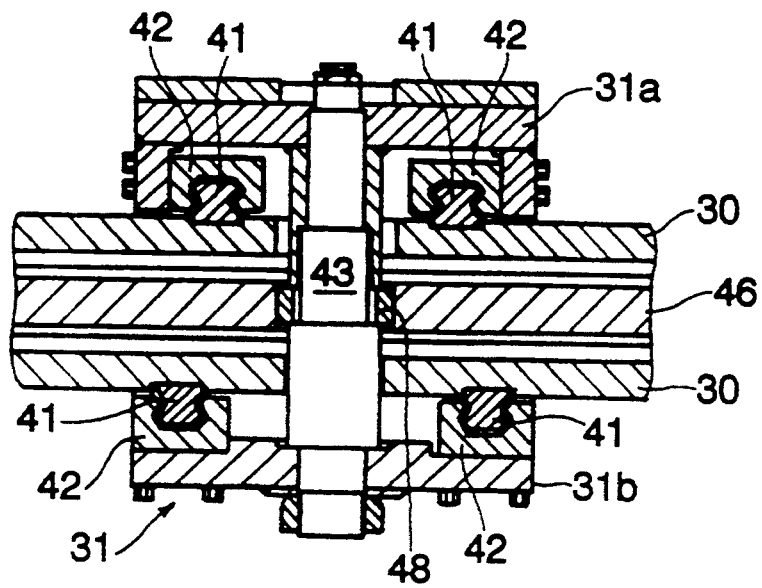
FIG. 11 is a sectional view taken along the line XI—XI of FIG. 10.
Figure 12:
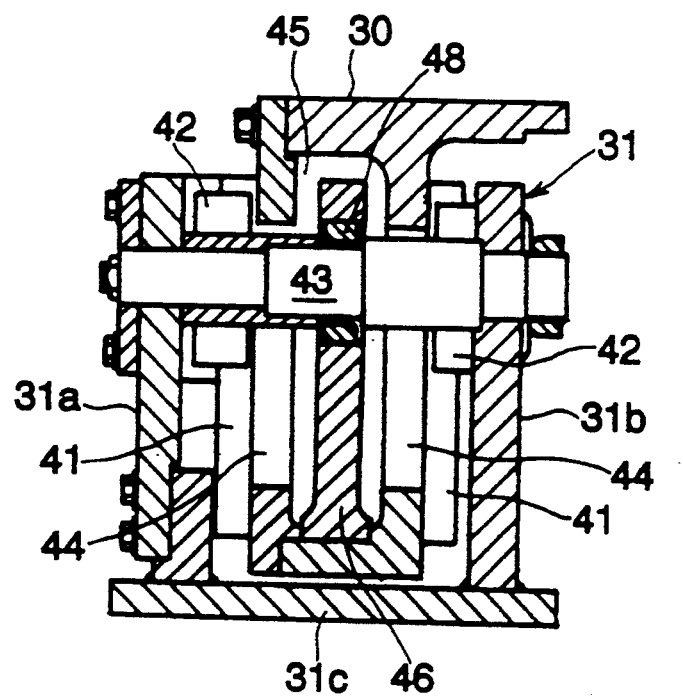
FIG. 12 is a sectional view taken along the line XII—XII of FIG. 10.

The detail structure of the outer periphery holding body 28 will be described below with reference to FIGS. 10 to 12. FIG. 10 is a partial front view of the outer periphery holding body 28, wherein the vicinity of the outer periphery holding segment 31 shown at the central and uppermost portion of FIG. 8 is enlarged; FIG. 11 is a sectional view taken along the line XI—XI of FIG. 10; and FIG. 12 is a sectional view taken along the line XII—XII of FIG. 10.

The outer periphery holding segment 31 includes right and left side plates 31a and 31b provided along both the sides of the supporting frame 30, and a holding plate 31c for connecting the inner ends of the side plates 31a and 31b to each other while crossing the opening 30a of the supporting frame 30. A pair of rail pieces 41 are provided on each side of the supporting frame 30 to extend in parallel to each other and in the radial direction. Sliding pieces 42 fixed on the inner side surfaces of the side plates 31a and 31b of the outer periphery holding segment 31 are slidably engaged with these rail pieces 41. Accordingly, the outer periphery holding segment 31 can be radially slid while being guided by the rail pieces 41. The right and left side plates 31a and 31b are connected to each other by a connecting shaft 43. The connecting shaft 43 passes through the supporting frame 30, specifically, through radially extending slit grooves 44 (see FIG. 12) which are provided on the supporting frame 30 such that the connecting shaft 43 can be radially moved together with the side plates 31a and 31b.

An annular space 45 for surrounding the opening 30a in a coaxial manner is provided within the supporting frame 30, and an annular rotating ring 46 is contained in the annular space 45 so as to be rotatable along the space. In the rotating ring 46, on the position corresponding to each outer periphery holding segment 31, a circular-arc guide hole 47 obliquely extending in the circumferential direction from one end 47a on the radially inner side to the other end 47b on the radially outer side is provided. The connecting shaft 43 passes through the guide hole 47, and is engaged with the guide hole 47 through a rotatable roller 48.

When the connecting shaft 43 is positioned at the end portion of the guide hole 47 on the radially outer side, the outer periphery holding segment 31 is, as shown by the solid line in FIG. 10, located at the radially outermost position, and the circumference which joins the holding plates 31c of respective outer periphery holding segments 31 is in the diameter-extending state. This is equivalent to the state of FIG. 7a. When the rotating ring 46 is rotated in the direction of the arrow a in such a state, the guide hole 47 is moved in the same direction; however, since the rotation of the outer periphery holding segment in the direction of the arrow a is suppressed by the engagement of the rail piece 41 with the sliding pieces 42, the outer periphery holding segment 31 is moved radially inward along the rail pieces 41 while being guided by the guide hole 47 through the connecting shaft 43. Thus, as shown by the two-dot chain line in FIG. 10, when the connecting shaft 43 reaches the end portion 47a of the guide hole 47 on the radially inner side, the outer periphery holding segment 31 is located at the radially innermost position, and therefore, the circumference formed by the holding plates 31c of respective outer periphery holding segments 31 is in the diameter-contracting state. This is equivalent to the state shown in FIGS. 7b and 7c, wherein the outer peripheral surface of the carcass body 6a is held by the holding plates 31c of the outer periphery holding segments 31 thus contracted in diameter.

The rotational action of the rotating ring 46 is carried out by an extending/contracting mechanism 49 shown in FIG. 8. The extracting/contracting mechanism 49 is composed of a stationary bracket 50 fixed on the supporting frame 30, and a cylinder apparatus 52 provided between the movable bracket 51 fixed on the rotating ring 46 and the cylinder apparatus 52, wherein the rotating ring 46 is rotated by the extension/contraction of the cylinder apparatus 52, to thus extend/contract the outer periphery holding segment 31.

Figure 13:
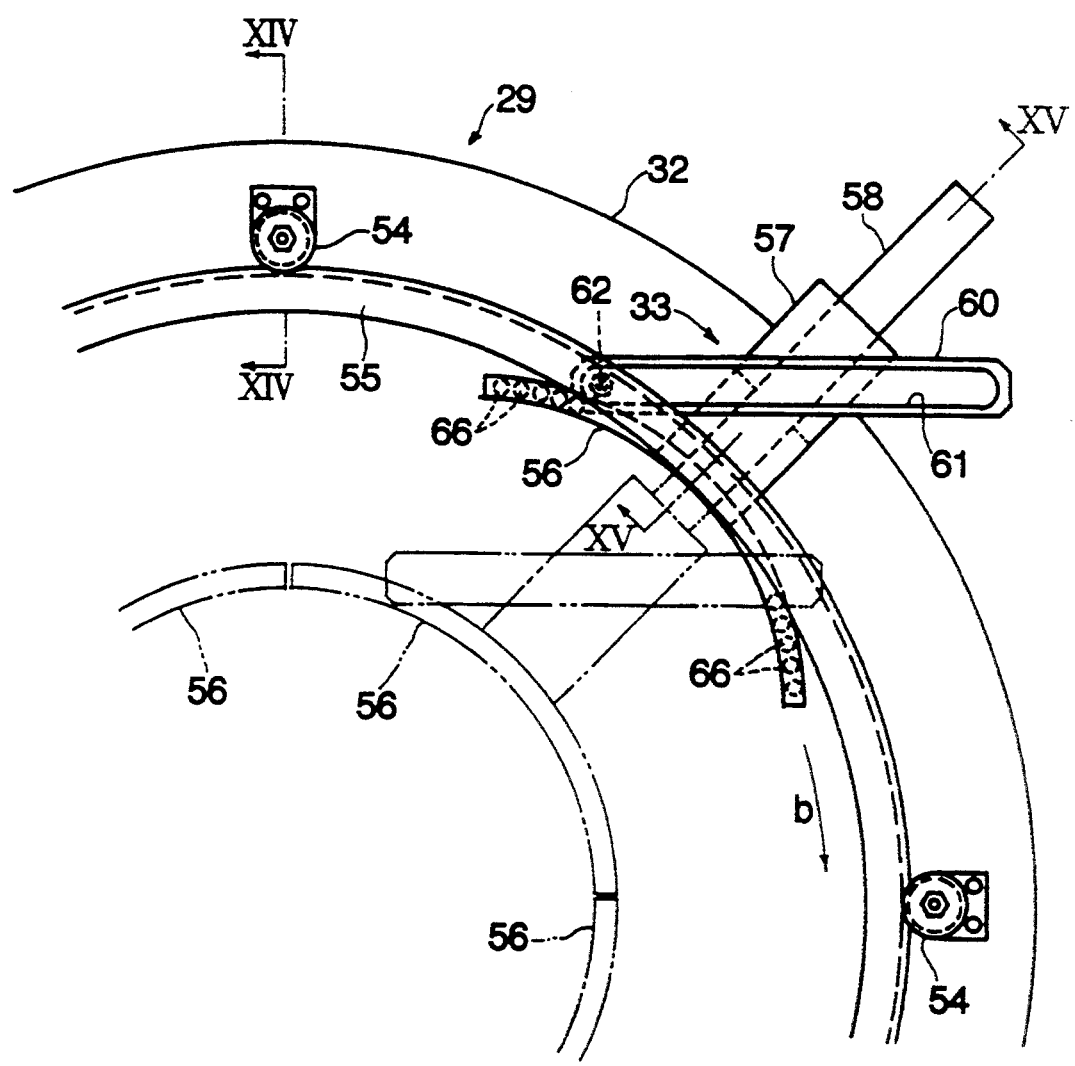
FIG. 13 is a partial front view of a bead portion holding body.
Figure 14:
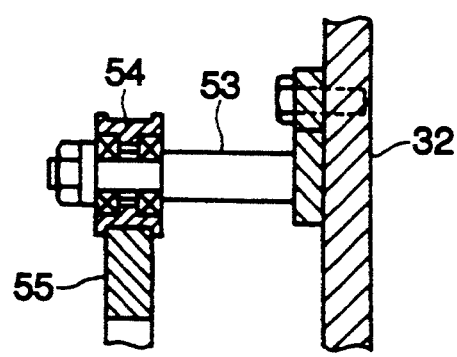
FIG. 14 is a sectional view taken along the line XIV—XIV of FIG. 13.
Figure 15:
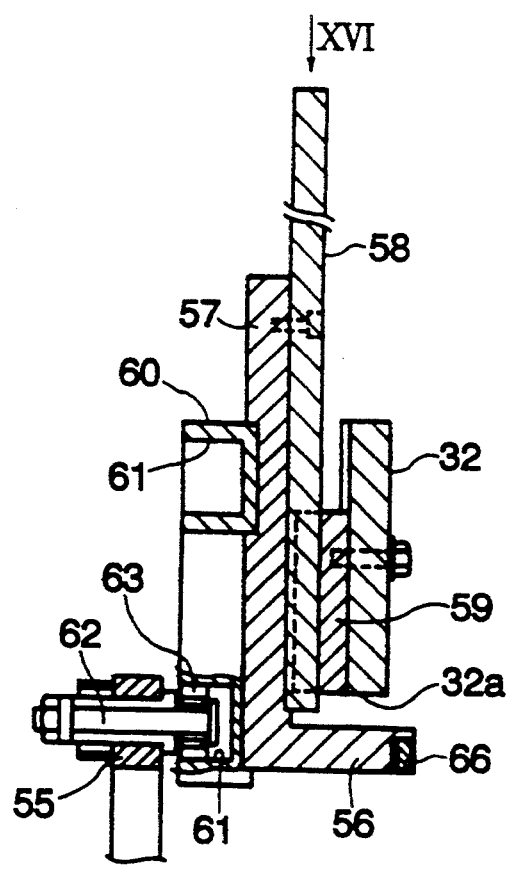
FIG. 15 is a sectional view taken along the line XV—XV of FIG. 13.
Figure 16:
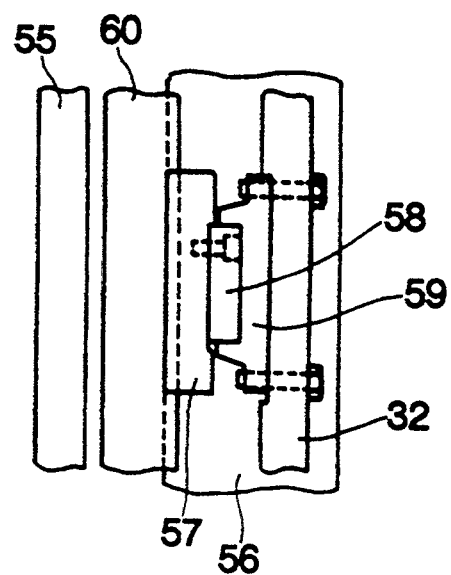
FIG. 16 is a view showing the outer surface of the bead portion holding body taken in the direction of the arrow X of FIG. 15.

The detailed structure of the bead portion holding body 29 will be described below with reference to FIGS. 13 to 16. FIG. 13 is a partial enlarged view of the bead portion holding body 29 shown in FIG. 8; FIG. 14 is a sectional view taken along the line XIV—XIV of FIG. 13; FIG. 15 is a sectional view taken along the line XV—XV of FIG. 13, and FIG. 16 is a view showing the outer surface of the bead portion holding body 29 taken in the direction of the arrow X of FIG. 15.

Each roller shaft 53 is projectingly provided on the outer surface of the supporting frame 32, at each end portion of two orthogonal axes (see FIG. 14). A roller 54 is rotatably pivoted by the roller shaft 53. A guide ring 55 is inserted on the inner peripheral side surrounded by respective rollers 54, and is rotatably supported by the roller 54 (see FIG. 8).

The bead portion holding segment 33 is composed of a segment portion 56 extending in the circumferential direction with a curvature larger than that of the opening 32a on the inner peripheral side of the opening 32a of the supporting frame 32 (FIG. 15), which is integrally formed at the inner end portion of a supporting portion 57 extending in the radial direction. Guide rails 58 are fixed on the side surface of the supporting portion 57 on the supporting frame 32 side. The guide rails 58 extend in the radial direction, and project outward more than the supporting portion 57. Guide blocks 59 slidably engaged with the guide rails 58 are fixed on the supporting frame 32, and the bead portion holding segment 33 can be radially moved while being guided by the guide blocks 59 through the guide rails 58.

A guide member 60 which is inclined in the circumferential direction such that the one end is positioned on the radially inner side and the other end is positioned on the radially outer side is integrally formed on the side surface of the supporting portion 57 on the guide ring 55 side. A guide groove 61 is formed on the guide member 60 so as to extend in the longitudinal direction along the guide member 60. A guide pin 62 provided on the guide ring 55 is engaged with the guide groove 61 through a rotatable roller 63.

When the guide pin 62 is engaged with the end portion positioned on the radially inner side of the guide groove 61, the bead portion holding segment 33 is located at the radially outermost position, as shown by the solid line in FIG. 13. When the guide ring 55 is rotated in the direction of the arrow b in such a state, the bead portion holding segment 33 is moved (contracted in diameter) radially inward while being guided by the guide groove 61 through the guide pin 62, depending on the engagement relationship between the guide pin 62 and the guide groove 61. Thus, when the guide pin 62 reaches the end portion of the guide groove 61 on the radially inner side, the bead portion holding segment 33 is located at the innermost position shown by the two-dot chain line in FIG. 13. Therefore, the segment portions 56 of four pieces of the bead portion holding segments 33 disposed on the supporting frame 32 with equal intervals are collected to each other, to form a substantially continuous circle having a diameter equal to that of the bead portion 5 of the carcass body 6a (see FIG. 7b).

The extending/contracting action of the bead portion holding segment 33 is performed by turning of the guide ring 55 using the extracting/contracting mechanism 64 shown in FIG. 8. The extending/contracting mechanism 64 is composed of a cylinder apparatus 65 having one end connected to the supporting frame 32 and the other end connected to the guide ring 55. The guide ring 55 is turned by the extension/contraction of the cylinder apparatus 65.

After the segment portions 56 of the bead portion holding segments 33 are contracted in diameter up to the positions facing to the bead portions 5 of the carcass body 6a, the bead portion holding body drive mechanism is operated to move the supporting frames 32 of the bead portion holding segments 29 and 29 on the right and left sides in the approaching direction until the segment portions 56 of the bead portion holding segments 33 are contacted with the bead portions 5 of the carcass body 6a.

A plurality of magnets 66 are disposed on the end surface of the segment portion 56 opposed to the bead portion 5. Since the magnets 66 attract the bead wire 4 buried in the bead portion 5, the bead portion 5 is certainly held by the segment portion 56. Further, the movement amount of each supporting frame 32 is accurately set by the control of the motor 38 on the basis of the signal from the encoder 40, so that the bead portion 5 is not deformed by the contact with the segment portion 56.

The holding/carrying apparatus 21 having the above-described construction achieves the function described with reference to FIG. 7.

What is claimed is:

1. A method of forming a green tire comprising:
    setting bead wires at both ends of a cylindrical carcass ply on a first forming drum, and forming a carcass body having bead portions;
    positioning a BT band formed in a separate process over an outer peripheral portion of said carcass body on said first forming drum, and deforming said carcass body into a toroidal shape, and incorporating said carcass body with said BT band;
    mounting said carcass body incorporated with said BT band onto a second forming drum around which side rubbers are wound through bladders at positions corresponding to said bead portions at both the ends of said carcass ply while keeping the shape of said carcass body; and
    expanding said bladders for press-bonding said side rubbers on both the ends of said carcass body.

2. A method of forming a green tire according to claim 1, wherein said carcass body with the BT band is carried to said second forming drum by a holding/carrying apparatus, said apparatus comprising an outer periphery holding body for holding the outer peripheral surface of said carcass body; and a pair of bead portion holding bodies positioned on both the sides of said outer periphery holding body for holding said bead portions of said carcass body with the BT band.

3. A method of forming a green tire according to claim 2, wherein said holding/carrying apparatus includes a bead portion holding body drive mechanism for approaching/separating said bead portion holding bodies on both the sides to or from each other symmetrically with respect to said outer periphery holding body; and each of said outer periphery holding body and said bead portion holding bodies is composed of a plurality of holding segments which are disposed in the circumferential direction with equal intervals and are movable in the radial direction, and a holding segment extending/contracting mechanism for radially moving said holding segments to extend/contract said holding segments in diameter.

* * * * *